United States Patent [19]

Sato et al.

[11] 3,944,643

[45] Mar. 16, 1976

[54] METHOD FOR MANUFACTURING SHAPED ARTICLES BY INJECTION-BLOW MOLDING

[75] Inventors: Wasuke Sato, Machida; Fumio Iriko, Tokyo; Yoshihiko Yuzawa, Yokohama; Setsuyuki Takeuchi, Ueda; Nobukuni Ibe, Nagano, all of Japan

[73] Assignees: Showa Denko K.K., Tokyo; Nissei Plastic Industrial Co., Ltd., Nagano, both of Japan

[22] Filed: Aug. 9, 1973

[21] Appl. No.: 387,164

Related U.S. Application Data

[62] Division of Ser. No. 160,480, July 7, 1971, abandoned.

[30] Foreign Application Priority Data

July 10, 1970  Japan.................................. 45-59881
Dec. 30, 1970  Japan.............................. 45-122689
June 29, 1971  Japan................................ 46-47782

[52] U.S. Cl. 264/97; 425/DIG. 208; 425/DIG. 209; 425/DIG. 216
[51] Int. Cl.² ........................................ B29C 17/07

[58] Field of Search ................... 264/89, 92, 94, 97; 425/242 B, DIG. 208, DIG. 209, DIG. 216, 387 B

[56] References Cited
UNITED STATES PATENTS

| 2,331,702 | 10/1943 | Kopitke ............................... 264/97 |
| 3,244,778 | 4/1966 | Ninneman........................ 264/97 X |
| 3,412,186 | 11/1968 | Piotrowski ....................... 264/97 X |
| 3,470,282 | 9/1969 | Scalora ................................ 264/97 |

*Primary Examiner*—Jan H. Silbaugh
*Attorney, Agent, or Firm*—Kemon, Palmer & Estabrook

[57] ABSTRACT

A method for manufacturing shaped articles by injection-blow molding. A thermoplastic material is first formed into a bottomed parison by injection-molding said material onto the surface of an injection molding core. The bottomed parison formed on the surface of the core is cooled to a temperature at which it is easily removed from the core, and is removed therefrom. The parison is heated again to a predetermined temperature and the reheated parison is transferred to a blow molding mold, wherein the parison is blow-molded.

3 Claims, 15 Drawing Figures

INVENTOR.
WASUKE SATO ET AL
BY
KENYON, PALMER & ESTABROOK

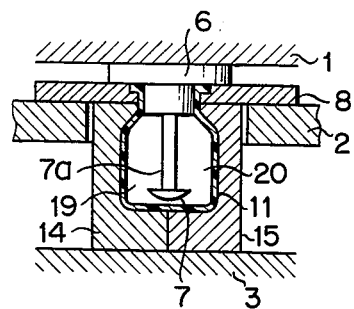
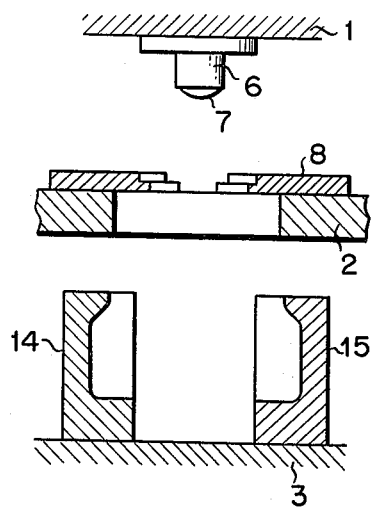
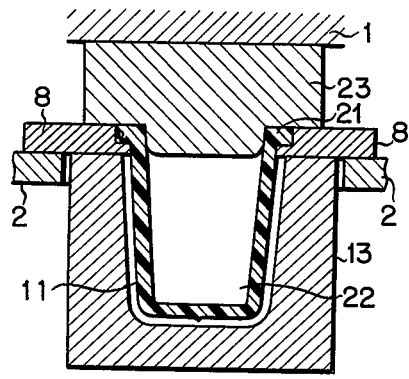
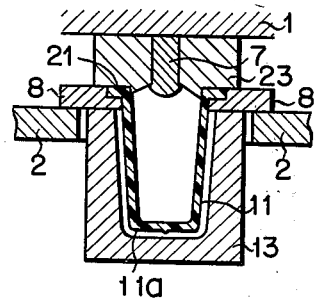
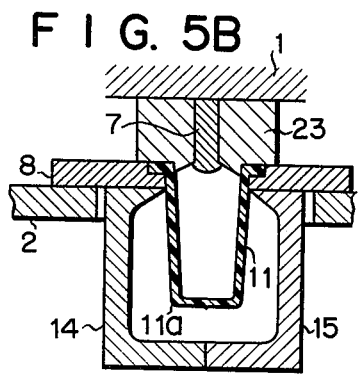
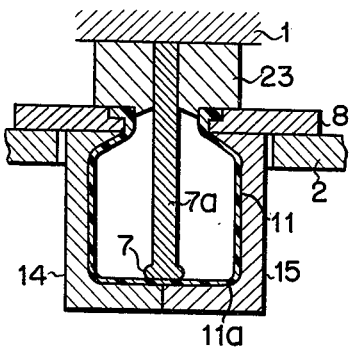

METHOD FOR MANUFACTURING SHAPED ARTICLES BY INJECTION-BLOW MOLDING

This is a division of application Ser. No. 160,480, filed July 7, 1971, now abandoned.

This invention relates to a method for manufacturing articles of a thermoplastic material by means of injection-blow molding.

The injection-blow molding is widely employed for manufacturing hollow articles of a thermoplastic material today. In this method, a bottomed parison is first formed from a molten plastic material by means of injection molding, and the parison is transferred to a blow molding mold and is expanded by blowing compressed air thereinto. The method comprises steps of injection molding of a parison, transfer of the parison to a blow molding mold, closing of the blow molding mold, blowing of compressed air, cooling, opening of the blow molding mold, and removal of the formed hollow article in this order.

Such injection-blow molding is advantageous in that a step for finishing the opening of formed articles is not required because the opening is formed very precisely by injection molding, there is no need for cutting off the bottom, weak spots are not formed, and material loss is small.

In this injection-blow molding method, however, the quality of the formed articles is sensitively influenced by temperature and state of the parison which is formed by injection molding. That is, if the temperature of the parison is too high, its release from the mold is troubled because of the adhesion thereof to the core, and the subsequent blow-molding is made impossible. Or if temperature of the parison is too low, the blow molding is now impossible because of the high viscosity of the parison. Therefore, the temperature conditions pertaining to the parison must be very strictly adjusted.

Unfortunately in the prior art method of injection molding, temperature conditions pertaining to the parison cannot be so precisely set. Especially in the case where thin articles are made, it is essential to control temperature very strictly and to secure a uniform temperature distribution. But such strict temperature control is impossible in the prior art method, and therefore it is extremely difficult to manufacture large articles with small thickness.

Further, articles excellent in mechanical strength and transparency cannot be manufactured by the prior art injection-blow molding method. In the prior art method, a bottomed parison formed by injection molding is immediately blow-molded by compressed air, and therefore it is extremely difficult to carry out the blow molding in a manner to give orientation to the formed article, if it is desired.

This invention was completed for the purpose of eliminating the technical difficulties of the prior art injection-blow molding as mentioned above, and providing a method for injection-blow molding product of high quality with good efficiency. The method of this invention is characterized in that a bottomed parison of a thermoplastic material is formed by injection-molding said material on the surface of an injection molding core, the thus formed parison is cooled to a temperature at which the parison is easily removed from the core, and is removed from the core surface, then the parison is reheated to a predetermined temperature and is transferred to a blow molding mold, wherein it is blow-molded.

The method of this invention contains steps of cooling a formed parison, removing the parison from the injection molding core, and reheating the parison prior to the subsequent blow molding; and inclusion of these steps makes it possible to produce articles excellent in mechanical strength and transparency, and to carry out the blow molding of the parison so as to give orientation to the manufactured articles. Further in accordance with this invention, excellent articles are produced by strictly controlling the temperature conditions with respect to the parison.

This invention can be more fully understood from the following detailed description when taken in connection with reference to the accompanying drawings in which:

FIGS. 3A to 3H are diagrams to show operation in each step of the injection-blow molding method of this invention;

FIG. 4 is a diagram showing another example of the reheating step in the injection-blow molding of this invention;

FIGS. 5A to 5C is a diagram showing still other example of the reheating step and the blow molding step in the injection-blow molding method of this invention.

Now the invention is illustrated by way of working examples with reference to the attached drawings.

Figure 1:
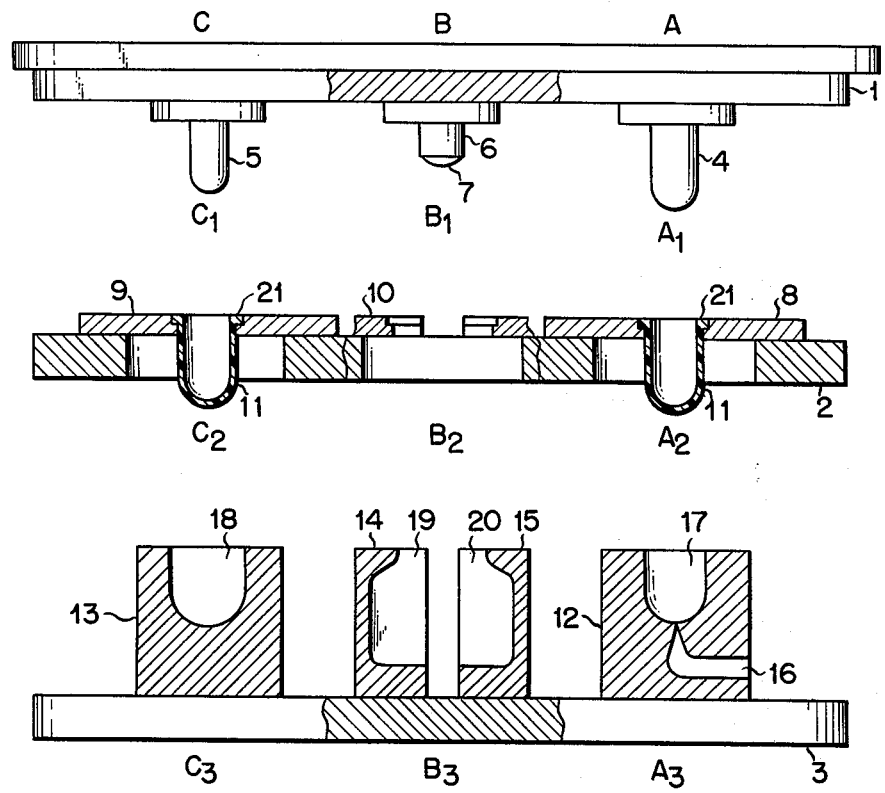
FIG. 1 is a vertical section schematically showing an example of the injection-blow molding apparatus of this invention.

FIG. 1 shows the mold supporter comprising an upper mold supporting disk 1, a middle mold supporting disk 2 and a lower mold supporting disk 3 each placed movably at the corresponding position. Part A represents an injection molding section (comprising corresponding parts $A_1$, $A_2$ and $A_3$), part B represents a blow molding section (comprising $B_1$, $B_2$ and $B_3$) and part C represents a bottomed parison reheating section (comprising corresponding parts $C_1$, $C_2$ and $C_3$).

Figure 2:
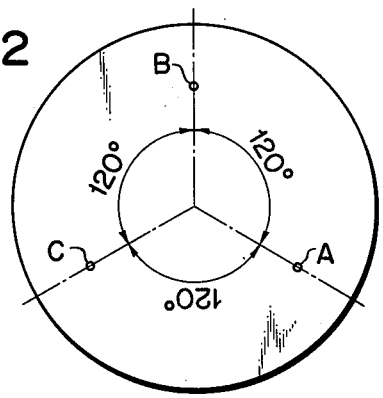
FIG. 2 is a diagram showing arrangement of the injection molding section, the parison reheating section and the blow molding section.

FIG. 2 shows arrangement or relative positions of parts A, B and C, which are radially placed with an angle of 120° inbetween. That is, $A_1$, $B_1$ and $C_1$ of the upper mold supporting disk 1; $A_2m$ $B_2$ and $C_2$ of the middle mold supporting disk 2 and $A_3$, $B_3$ and $C_3$ of the lower mold supporting disk 3 are respectively radially arranged with an angle of 120°.

On the lower side of the vertically removable upper mold supporting disk 1, an injection molding core 4, a heating projection 5 for heating the inside of the bottomed parison and a blow molding core 6 are provided at the positions of $A_1$, $C_1$ and $B_1$ respectively. At the lower end of the blow molding core 6, a stretching rod 7 is provided so as to longitudinally stretch the reheated bottomed parison when it is blow-molded. As shown in FIG. 3G, the stretching rod can be extended downward by a stem 7a.

On the upper side of the middle mold supporting disk 2, holders 8, 9 and 10 are provided with an angle of 120° therebetween at the positions respectively corresponding to $A_2$, $C_2$ and $B_2$, which respectively hold the opening 21 of a bottomed parison 11. The middle mold supporting disk is horizontally rotatable around an axis secured perpendicular to the surface thereof.

The lower mold supporting disk 3 is vertically removable, too, the upper side of which is provided with an injection molding mold 12, a heating device 13 and a blow molding mold 14, 15 at the positions corresponding to $A_3$, $C_3$ and $B_3$. The mold 12 comprises a cavity 17 and a gate 16. The heating device 13 has a cavity 18 in which the parison is heated by supplying heat from the heating device 13. The blow molding mold comprises two parts 14 and 15 which can be opened, each having a concavity 19 and 20.

Figure 3A:
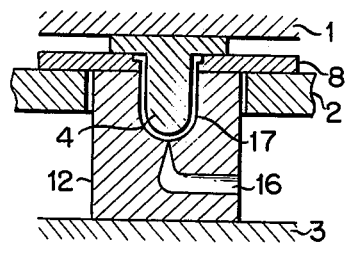
Figure 3B:
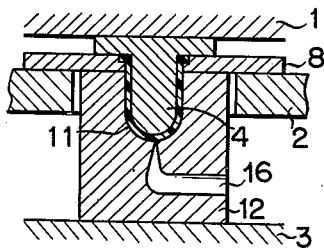
Figure 3C:
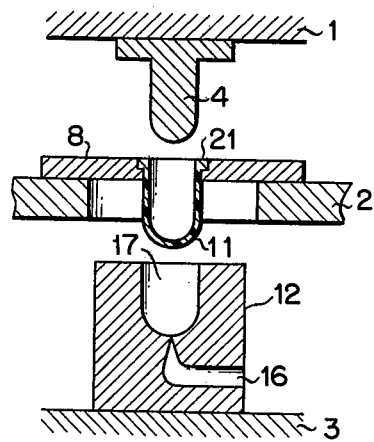
Figure 3D:
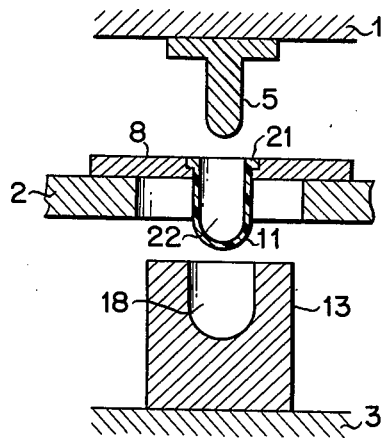
Figure 3E:
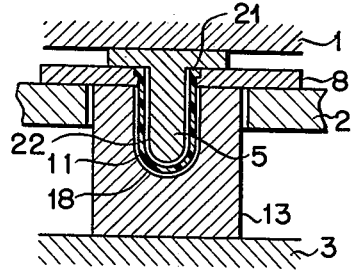

Now the operations of the injection-blow molding method in accordance with this invention for manufacturing shaped articles are specifically explained. FIG. 3A shows the state of the injection molding section when the upper, middle and lower mold supporting disks are joined together. A suitably plasticized plastic material is injected into the interstice formed by the mold block 12 and the core 4 through the gate 16. Thus a bottomed parison 11 is formed as shown in FIG. 3B. Then the upper and lower mold supporting disks are vertically moved apart from the middle mold supporting disk by a suitable driving means as shown in FIG. 3C. In this stage, the formed parison 11 is held by the holder 8 by the opening thereof 21. Then the middle mold supporting disk 2 is turned by 120° so that the parison 11 comes to the parison reheating section C as shown in FIG. 3D, and the upper, middle and lower mold supporting disks are joined together as shown in FIG. 3E. In this stage, the parison is embraced in the cavity 18 of the heating device 13, and the heating projection 5 is now inserted in the hollow 22 of the parison 11 and the parison is heated by being supplied with heat from both the heating projection 5 and the heating device 13. The heating device 13 and the heating projection 5 are provided with suitable heating elements such as heaters imbedded therein (not shown in the drawings). Thus the parison is reheated until the parison attains a state in which blow molding is completely effected.

The relations between the surface temperatures of the heating device 13 and the heating projection 5 versus the state of parisons are experimentally determined with respect to various materials, various sizes and various thicknesses of parisons. Thus suitable reheating temperatures at which orientation blow molding is satisfactorily carried out, for instance, can be selected by considering the above-mentioned experimental data and measured temperature.

Figure 3F:
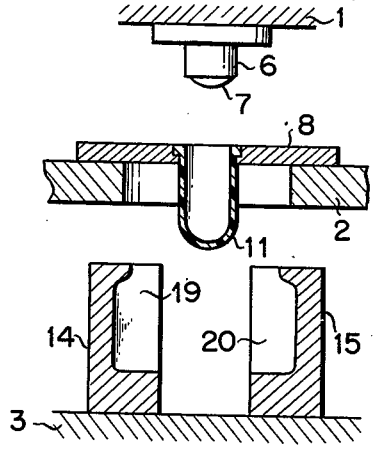

After the parison has been reheated, the upper and lower mold supporting disks are again separated from the middle mold supporting disk and the latter is turned further by 120°, until the reheated parison 11 comes to the blow molding section B as shown in FIG. 3F. Then the upper and lower mold supporting disks are joined together with the middle disk, and the two blocks 14, 15 of the blow molding mold are closed together as shown in FIG. 3G. At this stage, the stretching rod 7 of the blow molding core 6 extends downward stretching the reheated parison, at the same time or after stretching, compressed air is blown into the hollow of the parison through a passage (not shown) provided in the core 6 so as to laterally inflate it. After the blowing, again the three disks and the mold blocks are separated and the finished article is taken out as shown in FIG. 3H.

In the above-explained embodiment, the injection molding section, the blow molding section and the parison reheating section are arranged radially with an angle of 120°. But the angle is not always 120°. If the sections are arranged with a 60° angle, two sets of injection-blow molding equipment are provided in a machine. These sections are not necessarily arranged with an equal angle, either. Or, in each section, a plurality of molds, etc. can be fixed so that injection-blow molding can be carried out in parallel. Further, though the components of each section of each mold supporting disk are secured to one identical disk in the embodiment shown in FIG. 1, these are not necessarily secured to the same disk but can be secured to separate disks respectively.

In the steps of reheating as shown in FIGS. 3D and 3E, the opening 21 of a bottomed parison 11 may be deformed on account of shrinkage on occasions. Such deformation of the opening of parison is avoided and a best dimensional stability is attained by employing the following process.

The process is carried out, for instance, by using an inside supporter 23 provided with a shoulder which holds the inside of the opening 21 of a parison 11 as shown in FIG. 4 instead of the heating projection 5 as shown in FIG. 1. When this device is used as shown in FIG. 4, that is to say, when a bottomed parison 11 is reheated, the shoulder is inserted inside the opening 21 of the parison 11 and the opening 21 is fixed by the shouldered supporter 23 and the holder 8 so that no deformation occurs to the opening if shrinkage takes place in the parison when reheated. Thus the reheating step can be carried out without misgivings of irregularity in shape and dimensional disorder.

When the shouldered supporter 23 shown in FIG. 4 is used, heat is applied only from outside, that is, from the heating device 13 in the embodiment represented by FIG. 4. But if an inside supporter which is provided with the opening-holding shoulder and an extended part with heating elements therein, which is placed in the hollow 22 of a parison 11 yet does not contact the inside thereof, is used, heat can be supplied from inside of the parison, too. In this case quicker heating and more uniform heat distribution is effected, which makes the subsequent blow molding operation more precise and easier.

FIGS. 5A, 5B and 5C show another example of reheating and blow molding devices. In these figures, member 23 stands for an inside supporter equipped with a stretching rod 7 in its center. A bottomed parison obtained by the steps represented by FIGS. 3A to 3C is transferred to the reheating section C equipped with the heating device 13 and inside supporter 23 as shown in FIG. 5A wherein the opening 21 of the parison 11 is tightly held by the shoulder and the holder 8 and the parison 11 is heated by the heating device 13. After the parison is reheated, only the heating device 13 is removed and holder 8 and the inside supporter 23 are turned to the blow molding section B with the parison held thereon. Therefore, when this type of inside supporter is employed, the upper mold supporting disk 1 is not only upwardly removable, but also it must be horizontally rotatable around an axis perpendicular to the disk plane. At section B, the blow-molding mold 14, 15 is raised to be joined to the holder 8 so that they confine the parison therein as shown in FIG. 5B. Thus a finished article is obtained by extending the stretching rod 7 and introducing compressed air into the hollow of the parison through a passage (not shown in the drawings) provided in the inside supporter 23 so as to inflate the parison as shown in FIG. 5C. When this type of stretching rod is used, the blow molding core 6 secured to the upper mold supporting disk 1 as shown in FIG. 1 is not required.

When the parison is longitudinally stretched as being inflated by means of the stretching rod 7 which pushes the bottom 11a of the parison 11 after the parison is reheated as shown in FIGS. 5A to 5C, it is difficult to keep a balance between the temperatures of the rod 7 and the parison 11. If the temperature of the rod 7 is too low in comparison with that of the parison even if the parison is uniformly reheated, the part of the parison which contacts the rod 7 and its vicinity are hardened by cooling effect and are liable to be torn off on occasions, and thus blow molding is made impossible. To the contrary, if the temperature of the rod is too high, the bottom part 11a of the parison 11 which is in contact with the rod is softened and is perforated on occasions.

In order to avoid such undesirable phenomena, the reheating if preferably carried out with the rod 7 stretched until it contacts the inside of the bottom 11a of the parison 11. By heating the parison contacting the rod in body, the rod 7 is heated to much the same temperature as that of the parison 11, and therefore, the fear of tearing-off or perforation of the parison bottom when the parison is longitudinally elongated is eliminated. To attain this object, it is desirable to use a stretching rod the temperature of which can be regulated. When the rod 7 is contacted with the bottom 11a of the parison 11 when the latter is heated, the temperature of the former is to be raised to the temperature to which the parison bottom is heated. This is effected as expected, but presumably, as the stress concentrates to the part of the parison which contacts the stretching rod when the parison is longitudinally stretched, said part would have to be a little harder than the other parts. Therefore, the stretching rod 7 should preferably be kept at temperatures neither higher nor 20°C lower than those of the parison. Especially, particularly satisfactory results in the blow-molding of the parison are obtained when the temperature of the stretching rod is maintained at a temperature slightly (approximately 5° – 10°C) lower than that of parison. For the purpose of regulating the temperature of the stretching rod, a suitable heat transfer medium may well be circulated in said rod.

Figure 6:
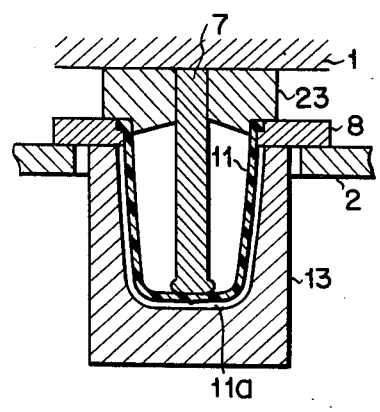
FIG. 6 is a diagram showing still another example of the reheating step in the injection-blow molding method of this invention.

In the embodiment represented by FIG. 6, the stretching rod is secured to the inside supporter 23. However, the stretching rod 7 may be secured to the injection molding core 4. In this case, after injection molding core 4 is removed from the parison, the reheating may be carried out in the state that the end of the stretching rod is maintained as it is in contact with the inside of the parison bottom.

In the above-mentioned embodiments, a parison 11 is reheated after it is completely removed from the injection molding core 4. However, the parison 11 may be not completely but partially removed.

EXAMPLE 1

A polypropylene resin, of which the density is 0.90 g/cm³ and the melt flow index is 7.0, was injection-blow-molded in accordance with the steps shown in FIGS. 3A to 3H. A bottomed parison was formed by injection-molding said resin at 250°C in the injection molding section. The parison was completely removed from the injection molding core after it was cooled and transferred to the reheating section, wherein it was heated at 145°C. The reheated parison is transferred to the blow molding section, wherein the parison was blow-molded with blowing pressure 5 Kg/cm² and blowing time 10 sec. by longitudinally stretching to 3.5 times the original length and inflating laterally to 4.0 times that of the original diameter, the blowing mold temperature being lowered to 40° – 60°C at the molding operation.

A bottle 260 cc in volume and 3.1 g in weight was obtained. Thickness of the bottom and the side was proved to be uniformly 0.1 mm. The bottle was free from scratches and irregularity in shape. The tensile strength of the produced bottle was 1000 – 1500 Kg/cm² [measured by a Tensilon (trade mark) tensile tester]. This is far higher than that of the conventional products which is no more than 350 – 450 Kg/cm².

EXAMPLE 2

A blended resin material consisting of 95 % by weight of an ethylene-propylene copolymer (ethylene content 2 – 3 % by weight), of which the density is 0.9 g/cm³ and the melt flow index is 7.0, and 5 % by weight of a polyethylene, of which the density is 0.96 g/cm³ and the melt index is 5.0, was injection-blow-molded in accordance with the process represented by FIGS. 3A to 3H, except that the reheating step was carried out by employing the equipment shown in FIG. 6.

First, in the injection molding section, the above material was injection-molded into a bottomed parison at the temperature of 185°C, and the parison was completely removed from the injection molding core after it was cooled. The parison was transferred to the reheating section, wherein it was reheated at 170°C with the reheating mold heated at 170°C. When the parison was reheated, the parison was heated up to 115°C while the end of a stretching rod, which was kept at 110°C by circulating therein an oil heated at 110°C, was pressed to the inside of the parison bottom. This made possible longitudinal elongation of the parison to 2.2 – 3.4 times that of the original length without perforation caused at the bottom in the step of the subsequent longitudinal stretching. Thus containers the content of which are 450 cc and 1350 cc respectively, and either of which weighed 12 g, were made. The thickness was 0.2 mm for the 450 cc container and 0.1 mm for the 1350 cc container. Both had uniform thickness and are free from irregularity in shape and scratch, etc. and are far better than the prior art products in transparency. The tensile strength was 800 – 1500 Kg/cm², which is far higher than the prior art products the strength of which is 350 – 450 Kg/cm².

Employment of the rod the end temperature of which is 90°C and 120°C resulted in tearing off and performation of the bottom respectively.

What we claim is:

1. A method for manufacturing shaped articles by injection blow molding comprising injection-molding a thermo-plastic material onto the surface of an injection molding core to form a bottomed parison; cooling the parison to a temperature at which it is easily removed from said core; removing the cooled parison from said core and transferring the cooled parison to a reheating mold; reheating the removed parison to a predetermined temperature; transferring the reheated parison to a blow molding mold; stretching longitudinally the reheated parison disposed within the blow-molding mold by extending a stretching rod downwards within the parison; and blow-molding said parison; characterized in that said reheating is performed in a manner that the stretching rod is disposed in contact with the inside bottom of the parison, so that the stretching rod is heated to much the same temperature as the parison and so that in the stretching step, the parison portion contacted with the stretching rod is prevented from being destroyed.

2. A method according to claim 1 characterized in that the temperature of said rod is regulated.

3. A method according to claim 1 characterized in that said stretching rod is temperature-controlled to keep that portion of the stretching rod contacted with the end portion of the parison at the temperature not higher than nor 20°C lower than that of the parison.

* * * * *

UNITED STATES PATENT OFFICE
CERTIFICATE OF CORRECTION

PATENT NO. : 3,944,643
DATED : March 16, 1976
INVENTOR(S) : WASUKE SATO, FUMIO IRIKO, YOSHIHIKO YUZAWA
SETSUYUKI TAKEUCHI, NOBUKUNI IBE It is certified that error appears in the above-identified patent and that said Letters Patent are hereby corrected as shown below:

[30] Foreign Application Priority Data

June 29, 1971    Japan        46-46782

Signed and Sealed this

Twenty-first Day of September 1976

[SEAL]

Attest:

RUTH C. MASON
*Attesting Officer*

C. MARSHALL DANN
*Commissioner of Patents and Trademarks*